(12) United States Patent
Wang et al.

(10) Patent No.: US 12,401,442 B2
(45) Date of Patent: Aug. 26, 2025

(54) METHOD FOR OPTIMIZING OTN RESOURCES, COMPUTER DEVICE AND STORAGE MEDIUM

(71) Applicant: ZTE CORPORATION, Guangdong (CN)

(72) Inventors: Dajiang Wang, Guangdong (CN); Youdao Ye, Guangdong (CN); Zhenyu Wang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 289 days.

(21) Appl. No.: 18/023,347

(22) PCT Filed: Aug. 6, 2021

(86) PCT No.: PCT/CN2021/111209
§ 371 (c)(1),
(2) Date: Feb. 25, 2023

(87) PCT Pub. No.: WO2022/042262
PCT Pub. Date: Mar. 3, 2022

(65) Prior Publication Data
US 2023/0361902 A1    Nov. 9, 2023

(30) Foreign Application Priority Data
Aug. 31, 2020  (CN) .......................... 202010899413.3

(51) Int. Cl.
*H04Q 11/00* (2006.01)
*H04J 3/16* (2006.01)
(52) U.S. Cl.
CPC ........ *H04J 3/1652* (2013.01); *H04Q 11/0062* (2013.01); *H04Q 2011/0086* (2013.01)
(58) Field of Classification Search
CPC ................................................. H04Q 11/0062
See application file for complete search history.

(56) References Cited

U.S. PATENT DOCUMENTS

| 2019/0138948 A1* | 5/2019 | Janulewicz ........... H04L 45/124 |
| 2019/0230046 A1 | 7/2019 | Djukic |
| 2020/0272905 A1 | 8/2020 | Saripalli |

FOREIGN PATENT DOCUMENTS

JP    2018207180 A    12/2018

OTHER PUBLICATIONS

Chen et al., "DeepRMSA: A Deep Reinforcement Learning Framework for Routing, Modulation and Spectrum Assignment in Elastic Optical Networks", Journal of Lightwave Technology, vol. 37, No. 16, Aug. 2019 (Year: 2019).*

(Continued)

*Primary Examiner* — Shi K Li
(74) *Attorney, Agent, or Firm* — Li & Cai Intellectual Property (USA) Office

(57) ABSTRACT

The present disclosure provides a method for optimizing OTN resources, including: determining and creating, according to an action policy, a service to be created in a current service creation state, calculating a timely reward in the current service creation state, entering a next service creation state until an episode is ended, and calculating and updating, according to the timely reward in each service creation state, an optimized objective policy parameter in each service creation state; iterating a preset number of episodes to calculate and update the optimized objective policy parameter in each service creation state; determining, according to the optimized objective policy parameter in each service creation state in the preset number of episodes, a resultant optimized objective policy parameter in each service creation state; and updating the action policy according to the resultant optimized objective policy parameter in each service creation state.

13 Claims, 2 Drawing Sheets

(56) References Cited

OTHER PUBLICATIONS

Suarez-Varela et al., "Routing in optical transport networks with deep reinforcement learning", Journal of Optical Communications and Networking, vol. 11, No. 11, Nov. 2019 (Year: 2019).*

China Patent Office, First Office Action dated May 30, 2025, for corresponding CN application No. 202010899413.3.

Xiaoliang Chen, et al., "DeepRMSA : A Deep Reinforcement Learning Framework for Routing, Modulation and Spectrum Assignment in Elastic Optical Networks ", Journal of Lightwave Technology, Jun. 18, 2019, pp. 4155-4163, vol. 37, Issue 16.

Jose Suarez-Varela, et al., "Routing in optical transport networks with deep reinforcement learning", Journal of Optical Communications and Networking, issued on Sep. 24, 2019, pp. 547-558, vol. 11, Issue 11.

* cited by examiner

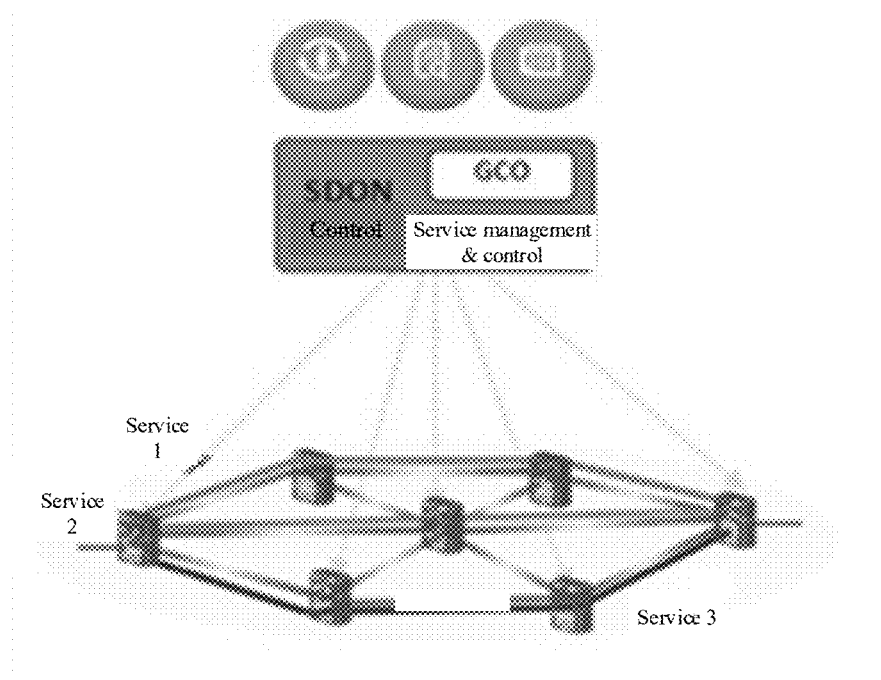

FIG. 1

| Determine and create, according to an action policy, a service to be created in a current service creation state, calculate a timely reward in the current service creation state, enter a next service creation state until an episode is ended, and calculate and update, according to the timely reward in each service creation state, an optimized objective policy parameter in each service creation state | S11 |

↓

| Iterate a preset number of episodes to calculate and update the optimized objective policy parameter in each service creation state | S12 |

↓

| determine, according to the optimized objective policy parameter in each service creation state in the preset number of episodes, a resultant optimized objective policy parameter in each service creation state | S13 |

↓

| Update the action policy according to the resultant optimized objective policy parameter in each service creation state | S14 |

FIG. 2

METHOD FOR OPTIMIZING OTN RESOURCES, COMPUTER DEVICE AND STORAGE MEDIUM

The present application claims the priority from Chinese patent application No. 202010899413.3 filed on Aug. 31, 2020, the entirety of which is incorporated hereby by reference.

TECHNICAL FIELD

The present disclosure relates to the field of automatic control technology, and in particular, relates to a method for optimizing OTN resources, an apparatus for optimizing OTN resources, a computer device and a computer-readable storage medium.

BACKGROUND

With the development of artificial intelligence technology, an application of the reinforcement learning technology has gained more and more attention in various fields and industries. Reinforcement learning, also called assessment learning, is an important machine learning method that has many applications in the fields of intelligent control robots, network analysis and prediction, and the like. The connectionism machine learning school divides learning algorithms into three types, i.e., unsupervised learning, supervised learning, and reinforcement learning.

Reinforcement learning is a mode in which an Agent learns in a trial-and-error manner, is a reward-guidance action obtained through interaction with the environment, and aims to enable the Agent to obtain a maximum reward. The main difference of the reinforcement learning from the supervised learning in the connectionism learning lies in a reinforcement signal. The reinforcement signal provided by the environment in the reinforcement learning (generally is a scalar signal) is used to assess a quality of a generated action, instead of telling a reinforcement learning system (RLS) how to generate a correct action. Since little information is provided from the external environment, the RLS has to learn from its own experiences. In this way, the RLS gains knowledge in the action-assessment environment, and improves the action scheme to adapt to the environment.

In recent years, with the application and popularization of the reinforcement learning technology, how to apply reinforcement learning to the field of intelligent management and control, and operation and maintenance of an optical transport network (OTN), especially, an application of reinforcement learning in optimizing OTN resources, has received wide attention from experts in the field relating to an OTN.

SUMMARY

In an aspect, the present disclosure provides a method for optimizing network resources of an optical transport network (OTN), including: determining and creating, according to an action policy, a service to be created in a current service creation state, calculating a timely reward in the current service creation state, entering a next service creation state until an episode is ended, and calculating and updating, according to the timely reward in each service creation state, an optimized objective policy parameter in each service creation state; iterating a preset number of episodes to calculate and update the optimized objective policy parameter in each service creation state; determining, according to the optimized objective policy parameter in each service creation state in the preset number of episodes, a resultant/desired optimized objective policy parameter in each service creation state; and updating the action policy according to the resultant/desired optimized objective policy parameter in each service creation state.

In another aspect, the present disclosure further provides an apparatus for optimizing network resources of an optical transport network (OTN), including a first processing module, a second processing module and an updating module, where the first processing module is configured to determine and create, according to an action policy, a service to be created in a current service creation state, calculate a timely reward in the current service creation state, enter a next service creation state until an episode is ended, and calculate and update, according to the timely reward in each service creation state, an optimized objective policy parameter in each service creation state; iterate a preset number of episodes to calculate and update the optimized objective policy parameter in each service creation state; the second processing module is configured to determine, according to the optimized objective policy parameter in each service creation state in the preset number of episodes, a resultant/desired optimized objective policy parameter in each service creation state; and the updating module is configured to update the action policy according to the resultant/desired optimized objective policy parameter in each service creation state.

In yet another aspect, the present disclosure further provides a computer device, including: at least one processor; and a storage device having at least one program stored thereon, the at least one program, when executed by the at least one processor, causes the at least one processor to implement the method for optimizing network resources of the OTN as described above.

In still another aspect, the present disclosure further provides a computer-readable storage medium storing a computer program thereon, the computer program, when executed by a processor, causes the processor to implement the method for optimizing network resources of the OTN as described above.

BRIEF DESCRIPTION OF DRAWINGS

FIG. 1 is a schematic diagram of global co-current optimization under a software defined optical network (SDON) architecture according to the present disclosure;

FIG. 2 is a schematic flowchart of optimizing OTN resources according to the present disclosure;

DETAILED DESCRIPTION

Figure 3:
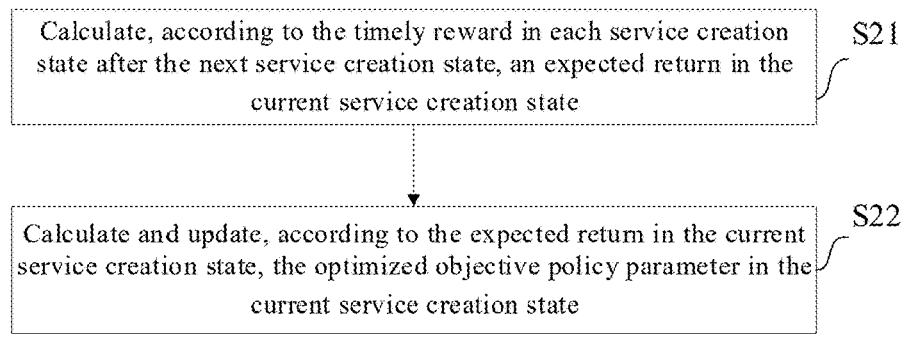
FIG. 3 is a schematic flowchart of calculating an optimized objective policy parameter according to the present disclosure.

Example implementations will be described more sufficiently below with reference to the accompanying drawings, but they may be embodied in different forms and should not be construed as limited to those set forth herein. These implementations are provided so that the present disclosure will be more thorough and complete, and will fully convey the scope of the present disclosure to those skilled in the art.

As used herein, the term "and/or" includes any and all combinations of one or more of the associated listed items.

The terminology used herein is for the purpose of describing specific implementations only and is not intended to limit the present disclosure. As used herein, the singular forms "a", "an" and "the" are intended to include the plural forms as well, unless the context clearly indicates otherwise. It will be further understood that as used herein, the terms "comprise/include" and/or "consist of/made of . . . " specify the presence of specific features, integers, steps, operations, elements, and/or components, but do not preclude the presence or addition of one or more other features, entities, steps, operations, elements, components, and/or groups thereof.

The implementations described herein may be described with reference to plan and/or sectional views in idealized representations of the present disclosure. Accordingly, the example illustrations may be modified in accordance with manufacturing techniques and/or tolerances. Accordingly, the implementations are not limited to the implementations shown in the drawings, but include modifications of configurations formed based on a manufacturing process. Thus, regions illustrated in the figures have schematic properties, and shapes of the regions shown in the figures illustrate specific shapes of the regions of elements, but are not intended to be limitative.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the related art and the present disclosure, and will not be interpreted in an idealized or overly formal sense unless expressly so defined herein.

A global co-current optimization (GCO) scheme based on a software defined optical network (SDON) architecture is shown in FIG. 1. A main object of the GCO scheme is to, during planning or creating OTN services in batches in a process of allocating OTN resources, on the premise of avoiding obstruction in routing calculation and resource allocation for each service, make routings and a sum of resources calculated for each service maximally satisfy an established resource allocation optimization goal of a user (i.e., a network service operator) for the network services as a whole. With the GCO technology, the capital expenditure (CAPEX)/operation expenditure (OPEX) of the user can be minimized, the operation and maintenance income can be improved, and the transmission performance and quality can be optimized, which are directly associated with the economic benefit of network operation of the user, so that the technology has obtained a high attention among users, and how to optimize the OTN resources has great significance.

In a deployment of OTN services, corresponding OTN resources (such as a bandwidth, a spectrum, a wavelength, a modulation format, a routing, or the like) are typically allocated to each service according to operation expectations, and resource optimization for each entire service under a specified optimization policy is desired to be satisfied. The optimization policy includes minimizing the latency or routing cost or the like of the entire service. Moreover, in order to maximize the operation income, optimize the service performance, minimize investment of CAPEX/OPEX, and the like, an operation of each OTN service is further desired to, under an established optimization policy, satisfy an overall optimization of the OTN service on usage of network resources, including, for example, minimizing a service latency or routing cost of an OTN, or maximizing a bandwidth utilization rate of the OTN service, or the like. Therefore, during creating the OTN service, not only optimization of resources of each OTN service itself is desired to be satisfied, but also global optimization on usage of the OTN resources by services is desired to be satisfied by arranging a sequence of creating the services.

The OTN services are typically created in a concurrent mode. In other words, multiple services are intensively created in batches at a certain time, the process of creating the services actually determines a sequence of creating all the services, and the sequence of creating the OTN services determines an occupation pattern of the OTN resources and an optimization state of allocating the OTN resources. The sequence of creating the OTN services is called a policy (i.e., an action policy) for creating and arranging services, and a good policy for creating and arranging services can satisfy the optimization policy for the OTN services utilizing the network resources.

In an initialization stage, n OTN services are created according to environmental conditions of an OTN topology (including a mesh type, a star type, or any other structural type), and a network environment state, an action space, an action optimization objective policy, and an action policy are initialized. Relevant parameters in the reinforcement learning algorithm are defined as follows.

First, an OTN optimization objective function is defined.

The OTN optimization objective function may be a minimum routing cost $Obj_{MinCost}$ of the OTN service.

$$Obj_{MinCost} \leftarrow \min\left[\sum_{i=1}^{n} \text{Cost}(Svc_i)\right], \text{Cost}(Svc_i)$$

is the routing cost of an $i^{th}$ service $Svc_i$.

The OTN optimization objective function may also be a shortest latency $Obj_{MinDelay}$ of the OTN service.

$$Obj_{MinDelay} \leftarrow \left[\sum_{i=1}^{n} \text{Delay}(Svc_i)\right], \text{Delay}(Svc_i)$$

is the latency of the $i^{th}$ service $Svc_i$.

Second, a feature vector of a service creation state is defined.

A feature vector $\phi(s)$ is used to describe a service creation state, and the feature vector $\phi(s)$ indicates which services are currently created and which are not created. In response to that a service to be created is created, a next service creation state is entered.

The feature vector $\phi(s)$ of the service creation state S is described as:

Q(s)={StateID; SumSvcCost; SumSvcDelay; SvcNum; . . . $SvcID_i$;$SvcCost_i$; $SvcDelay_i$;$SvcSeqID_i$; $SvcRtID_i$;$SrcNdID_i$;$DstNdID_i$; . . . };

where StateID is an identifier (ID) of the service creation state;

SumSvcCost is a sum routing cost of all current services, and the routing cost of a service not created is 0;

SumSvcDelay is a sum latency of all current services, and the latency of the service not created is 0; and SvcNum is a total number of all services in the OTN, and equal to a sum number of created services and services to be created.

A group of attribute sequences of the service creation state of an $i^{th}$ service in the network are represented by the following feature vector elements, where front and rear ellipses represent attribute sequences of the service creation state of first i−1 services and last n−i services which are defined in a same mode, SvcID$_i$ is a service ID of the $i^{th}$ service;

Svccost$_i$ is the routing cost of the $i^{th}$ service, and if the service is not created, the routing cost is 0;

SvcDelay$_i$ is the latency of the $i^{th}$ service, and if the service is not created, the latency is 0;

SvcSeqID$_i$ is a sequence ID of the $i^{th}$ service in the OTN services, if the service is not created, the sequence ID of the service is 0;

SveRtID$_i$ is a routing ID occupied by the $i^{th}$ service, if the service is not created, the routing ID of the service is 0;

SreNdID$_i$ is a source node ID of the $i^{th}$ service; and

DstNdID$_i$ is a destination node ID of the $i^{th}$ service.

Third, an episode is defined.

The process of adopting a certain action policy to complete sequential creation of the OTN services is defined as an episode.

Fourth, an action $a_t$ and an action policy are defined.

An action refers to a process of selecting one of a plurality of services to be created as a next service to be created in a current network topology environment state, and selecting one of a plurality of alternate routings (routings already allocated with resources) of the service to be created as a resource routing for the service, and creating the service.

The action policy π(s,a) or μ(s,a) (also written as μ(s)) represents a sequence of creating the services to be created (including routings of the services to be created).

The present disclosure provides a method for optimizing OTN resources. As shown in FIG. 2, the method includes the following operations S11 to S14.

At operation S11, determining and creating, according to an action policy, a service to be created in a current service creation state, calculating a timely reward in the current service creation state, entering a next service creation state until an episode is ended, and calculating and updating, according to the timely reward in each service creation state, an optimized objective policy parameter in each service creation state.

In this operation, in each episode, a service to be created (including a routing for the service to be created) is determined according to an action policy, after the service to be created is created, a timely reward in the service creation state is calculated, then the current service creation state is ended, and a next service creation state is entered. According to the operation, a service to be created is created for each service creation state in each episode, a timely reward in the corresponding service creation state is calculated until the episode is ended, and according to the timely reward in each service creation state, an optimized objective policy parameter in each service creation state is calculated and updated.

In this operation, different algorithms may be used to calculate and update the optimized objective policy parameter. It should be noted that different optimized objective policy parameters may be obtained by utilizing different algorithms, and detailed descriptions of the algorithms will be given later.

At operation S12, iterating a preset number of episodes to calculate and update the optimized objective policy parameter in each service creation state.

In this operation, operation S11 is repeated and a preset number of episodes is iterated, to calculate update the optimized objective policy parameter in each service creation state of each episode.

At operation S13, determining, according to the optimized objective policy parameter in each service creation state in the preset number of episodes, a resultant/desired optimized objective policy parameter in each service creation state.

In this operation, for each service creation state, the resultant/desired optimized objective policy parameter in the service creation state is determined from optimized objective policy parameters in different episodes. It should be noted that different algorithms may determine the resultant/desired optimized objective policy parameter in different manners. After this operation, resultant/desired optimized objective policy parameters under all service creation states corresponding to all services to be created in the OTN can be obtained.

At operation S14, updating the action policy according to the resultant/desired optimized objective policy parameter in each service creation state.

The optimized objective policy parameter is used for representing a service creation state $S_t$ and an action $a_t$. In response to that the resultant/desired optimized objective policy parameter in a certain service creation state is determined, an optimized/desired action $a_t$ in the service creation state, i.e., an action for creating an optimized/desired service to be created in the service creation state, can be determined. Therefore, the optimized/desired service to be created (including a routing of the service to be created) in the service creation state can be determined, so that services to be created which are ranked according to the service creation states can be obtained, and the rank of the services to be created is an optimized action policy.

The method for optimizing OTN resources according to the present disclosure includes: determining and creating, according to an action policy, a service to be created in a current service creation state, calculating a timely reward in the current service creation state, entering a next service creation state until an episode is ended, and calculating and updating, according to the timely reward in each service creation state, an optimized objective policy parameter in each service creation state; iterating a preset number of episodes to calculate and update the optimized objective policy parameter in each service creation state; determining, according to the optimized objective policy parameter in each service creation state in the preset number of episodes, a resultant/desired optimized objective policy parameter in each service creation state; and updating the action policy according to the resultant/desired optimized objective policy parameter in each service creation state. According to the present disclosure, the rank of creations of OTN services is optimized with a reward-punishment mechanism of the reinforcement learning algorithm, to obtain an action policy with good convergence, high rigidness and high reliability, the problem of optimization of OTN resources is simplified into a problem of ranking of creations of OTN services, and global optimization of OTN resources is realized by obtaining the optimized action policy.

$R_t$ represents a timely reward obtained in the service creation state $S_t$, t is the number of created services in the service creation state $S_t$, where t=(0, . . . , n−1), and n is a total number of services to be created in the OTN. It should be noted that a manner for calculating the timely reward $R_t$ is related to a preset OTN optimization objective function. Taking the OTN optimization objective function being "a minimum routing cost of the OTN service" as an example, the value of $R_t$ is a reciprocal of the routing cost Svc $cost_i$ of a latest service $SveID_i$ created in the current service creation state, i.e., $R_t=1/\text{Svc cost}_i$. In this manner, the smaller the routing cost of the service to be created is, the greater the timely reward brought into the service creation state $S_t$, is, where in a state $S_0$, $R_0=0$.

In some implementations, as shown in FIG. 3, the calculating and updating, according to the timely reward in each service creation state, the optimized objective policy parameter in each service creation state includes the following operations S21 and S22.

At operation S21, calculating, according to the timely reward in each service creation state after the next service creation state, an expected return in the current service creation state.

In some implementations, the expected return in the current service creation state may calculated by:

$$G_t = \sum_{k=0}^{n-(t+1)} \gamma^k R_{t+k+1};$$

where $G_t$ is the expected return of executing an action $a_t$ in a service creation state $S_t$, $\gamma$ is a discount coefficient, and $0<\gamma<1$; R is the timely reward, t is the number of created services in the service creation state $S_t$, t=(0, . . . , n−1), and n is a total number of services to be created in the OTN.

It should be noted that the expected return in the last service creation state is the timely reward in the service creation state.

At operation S22, calculating and updating, according to the expected return in the current service creation state, the optimized objective policy parameter in the current service creation state.

Through operations S21 to S22, optimization of the optimized objective policy parameter is achieved by a reward-punishment mechanism of the enhancement learning algorithm.

In some implementations, the expected return $G_t$ in the last service creation state of each episode is an actual total return G for the episode, and after calculating the actual total return G in the last service creation state of each episode and before calculating the optimized objective policy parameter in the last service creation state of each episode, the method for optimizing OTN resources may further include: updating the actual total return G according to the actual total return, a preset threshold $G_{threshold}$ and a preset additional return $G_{add}$. If the actual total return is greater than or equal to the threshold, the actual total return is equal to the actual total return plus the additional return. If the actual total return is less than the threshold, the actual total return is equal to the actual total return minus the additional return. That is, if $G \geq G_{threshold}$, $G=G+G_{add}$, and the Agent obtains a positive additional return, i.e., an additional reward, if $G<G_{threshold}$, $G=G-G_{add}$, and the Agent obtains a negative additional return, i.e., an additional punishment.

In some implementations, $$G = \sum_{t=1}^{n} R_t,$$

where G is a total return obtained by the Agent at the end of each episode, and n is a total number of services to be created in the OTN.

Figure 4:
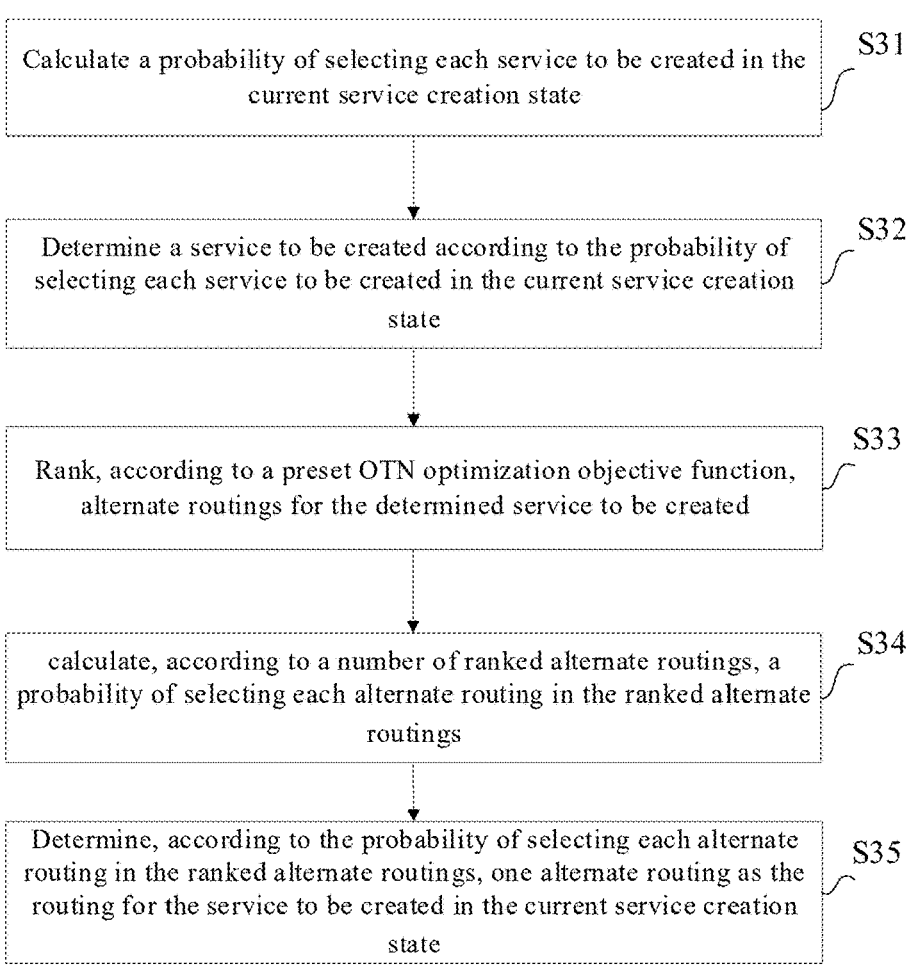
FIG. 4 is a schematic flowchart of determining a service to be created in a current service creation state according to the present disclosure.

In some implementations, as shown in FIG. 4, the determining, according to the action policy, the service to be created in the current service creation state includes the following operations S31 to S35.

At operation S31, calculating a probability of selecting each service to be created in the current service creation state.

In some implementations, the probability of selecting each service to be created in the current service creation state is calculated by:

$$p(s_{tsvci}) = \frac{1}{n-t}, p(s_{tsvci})$$

is a probability of selecting an $i^{th}$ service $Svc_i$ in a service creation state $S_t$, t is the number of created services in the service creation state $S_t$, where t=(0, . . . , n−1), and n is a total number of services to be created in the OTN, and if t=n, the number of the services to be created is 0, and the episode is ended.

At operation S32, determining a service to be created according to the probability of selecting each service to be created in the current service creation state.

It should be noted that, based on the exploration concept of reinforcement learning, the selection of the service to be created follows randomness of the policy.

At operation S33, ranking, according to a preset OTN optimization objective function, alternate routings for the determined service to be created.

The OTN optimization objective function includes a minimum routing cost of the OTN service or a shortest latency of the OTN service.

The selection of the alternate routings of the determined service to be created follows a greedy principle, in which all alternate routings are ranked according to the OTN optimization objective function. For example, if the OTN optimization objective function is the minimum routing $cos_t$, all the alternate routings of the determined service to be created may be ranked from small to large according to their respective route costs based on a policy for a minimum routing $cos_t$, with a k-shortest path algorithm (KSP), a routing and wavelength assignment algorithm (RWA) and an asymmetric encryption algorithm (RSA).

At operation S34, calculating, according to the number of the ranked alternate routings ranked, a probability of selecting each alternate routing in the ranked alternate routings.

In some implementations, if the number m of the ranked alternate routings is equal to 1, the probability of selecting the alternate routing is calculated by:

$$\mu(s_t, a_{t1}) = \frac{1}{n-t}.$$

If the number m of the ranked alternate routings is equal to 2, the probability of selecting one of the alternate routings is calculated by:

$$\mu(s_t, a_{t1}) = \frac{\varepsilon}{n-t},$$

and the probability of selecting the other alternate routing is calculated by:

$$\mu(s_t, a_{t2}) = \frac{1-\varepsilon}{n-t}.$$

If the number m of the ranked alternate routings is greater than 2 (i.e., m>2), the probability of selecting each of the first to $(m-1)^{th}$ alternate routings is calculated by:

$$\mu(s_t, a_{ti}) = \frac{(1-\varepsilon)^{i-1}}{n-t} \cdot \varepsilon,$$

and the probability of selecting the $m^{th}$ alternate routing is calculated by:

$$\mu(s_t, a_{tm}) = \frac{(1-\varepsilon)^{m-1}}{n-t},$$

where $\varepsilon$ is a greedy coefficient, and $0.5 < \varepsilon < 1$, t is the number of created services in the service creation state $S_t$, $t=(0, \ldots, n-1)$ and n is a total number of services to be created in the OTN, and $i=(1, \ldots, m-1)$.

At operation S35, determining, according to the probability of selecting each alternate routing in the ranked alternate routings, one alternate routing as the routing for the service to be created in the current service creation state.

In some implementations, the optimized objective policy parameter may be a state behavior value $Q_\pi(s,a)$, and $$Q_\pi(s, a) = E_\pi\left[\sum_{k=0}^{n-(t+1)} \gamma^k R_{t+k+1} \,\Big|\, s = s_t, a = a_t\right],$$

representing an expected accumulative return obtained after the Agent performs an action a according to an action policy $\pi$ starting from the service creation state $S_t$.

In some implementations, the optimized objective policy parameter may also be a state value $V_\pi(s)$, and $$V_\pi(s) = \sum_{a \in A} \pi(a \mid s) Q_\pi(s, a),$$

representing a weighted sum of all state behavior values $Q_\pi(s,a)$ in the service creation state S. $\pi(a|s)$ is a probability of taking an action a according to an action policy $\pi(s,a)$ in the service creation state S, and a is a set of actions performed in each service creation state.

In some implementations, in response to that the optimized objective policy parameter is the state behavior value $Q_\pi(s,a)$, the optimized objective policy parameter in each service creation state may be calculated and updated with a Monte Carlo process (MCP) algorithm, a TD-Error algorithm with different policies or a TD-Error algorithm with a same policy. In some implementations, a Q-Learning algorithm in the TD-Error algorithm with different policies may be used, or a State-Action-Reward-Action (SASA) algorithm in the TD-Error algorithm with a same policy may be used. Accordingly, the updating the action policy according to the resultant/desired optimized objective policy parameter in each service creation state (operation S14) includes: updating the action policy according to the state behavior value $Q_\pi(s,a)$.

For example, if the Q-Learning algorithm or the SASA algorithm is adopted, the determining the resultant/desired optimized objective policy parameter in each service creation state (operation S13) may include: determining, from the optimized objective policy parameters (i.e., the state behavior values $Q_\pi(s,a)$) in service creation states in the preset number of episodes, a maximum value of the resultant/desired optimized objective policy parameter in each service creation state.

In some implementations, in response to that the optimized objective policy parameter is the state value $V_\pi(s)$, the optimized objective policy parameter may be calculated and updated with a dynamic programming algorithm. Accordingly, the updating the action policy according to the resultant/desired optimized objective policy parameter in each service creation state (operation S14) includes: updating the action policy $\mu(s,a)$ according to the state value $V_\pi(s)$.

The process of optimizing OTN resources with the MCP, the Q-Learning algorithm, the SASA algorithm, and the dynamic programming algorithm will be described below.

(1) The process of optimizing OTN resources with an exploring initialization MCP includes:
  initializing the entire network topology environment, for all $s \in S$, $a \in A(s)$,
  $Q(s,a) \leftarrow 0$; where an initial value of the action policy is $\mu(s,a)$;
  returns $(s,a) \leftarrow$ emptylist;
  repeating the following processing:
  {
  according to $\mu(s,a)$, select $s_0 \in S$, $a_0 \in A(s)$, and generate a new episode;
  for each pair of (s,a) in the episode:
  $G \leftarrow$ a return after a first occurrence of (s,a);
  add G to returns (s,a);
  let the state behavior value $Q(s,a) \leftarrow$ average(returns(s,a)) by averaging returns;
  for each S in the Episode:
  $\pi(s) \leftarrow \arg\max_a Q(s,a)$;
  }.

(2) The process of optimizing OTN resources with the Q-Learning algorithm (i.e., TD-Error with different policies) includes:
  initializing the entire network topology environment, for all $s \in S$, $a \in A(s)$,
  $Q(s,a) \leftarrow 0$; the action policy is $\mu(s,a)$;
  repeating the following processing in each episode:
  initializing a state space S;
  repeating the following processing in each operation of the episode;
  selecting an action $a_t$ in a state $S_t$ according to the policy $\mu(s,a)$;
  performing the action $a_t$ and obtaining a timely reward $R_{t+1}$ and a next state $S_{t+1}$;
  let $Q(s_t,a_t) \leftarrow Q(s_t,a_t) + \alpha[R_{t+1} + \gamma \max_a Q(s_{t+1}, a) - Q(s_t,a_t)]$;
  $\alpha$ is a learning rate;
  $s_t \leftarrow s_{t+1}$;
  until $s_t$ becomes a termination state;
  until all $Q(s,a)$ are converged; and
  outputting a final policy: $\pi(s) \leftarrow \arg\max_a Q(s,a)$.

(3) The process of optimizing OTN resources with the SARSA algorithm (i.e., TD-Error with a same policy) includes:
  initializing the entire network topology environment, for all $s \in S$, $a \in A(s)$, $Q(s,a) \leftarrow 0$;

repeating the following processing in each episode:
initializing a state space S;
giving an initial state $s_0$, and selecting an action $a_0$ according to a greedy policy ε (taking an action with a maximum timely reward);
repeating the following processing in each operation of the episode:
selecting an action $a_t$ in a state $S_t$ according to the greedy policy ε, to obtain a timely reward $R_{t+1}$ and a next state $S_{t+1}$.
obtaining an action $a_{t+1}$ according to the greedy policy ε;
let $Q(s_t,a_t) \leftarrow Q(s_t,a_t) + \alpha[R_{t+1} + \gamma Q(s_{t+1},a_{t+1}) - Q(s_t,a_t)]$;
α is a learning rate;
st←$s_{t+1}$; at←$a_{t+1}$;
until $s_t$ becomes a termination state;
until all Q(s,a) are converged; and
outputting a final policy: $\pi(s) \leftarrow \text{argmax}_a Q(s,a)$.

(4) The process of optimizing OTN resources with the dynamic programming algorithm based on policy iteration includes the following operations 1 to 3.

At operation 1, initializing the entire network topology environment, in which
for all st∈S, a∈A(s), $V(s_t)=0$, and let all; $P_{ss'}^a=1$; and initializing the action policy to μ(s).

At operation 2, evaluating the policy,
in which $p(s_{t+1}, R_{t+1}|s_t,\mu(s))$ and $p(s_{t+1}, R_{t+1}|s_t,a)$ represent probabilities of taking the corresponding action a in the state $s_t$ with the policy μ(s);
repeating the following processing:
Δ←0;
for each st∈S
  v←$V(s_t)$;
  $V(s_t) \leftarrow \Sigma_{s_{t+1},R_{t+1}} p(s_{t+1}, R_{t+1}|s_t, \mu(s))[R_{t+1}+\gamma V(s_{t+1})]$
  Δ←max (Δ,|v−$V(s_t)$|);
until Δ<θ (where θ is a specified constant) is converged.

At operation 3, improving the policy, in which
for each st∈S;
  a←μ(s);
  $\mu(s) \leftarrow \arg\max_a \Sigma_{s_{t+1},R_{t+1}}|s_t,a)[R_{t+1}+\gamma V(s_{t+1})]$,
  if a≠μ(s), it represents that the policy is not converged; otherwise, the policy is converged; and
ending the algorithm if the policy is converged and returning V(s) and μ(s); otherwise, returning to the processing in operation 2.

Figure 5:
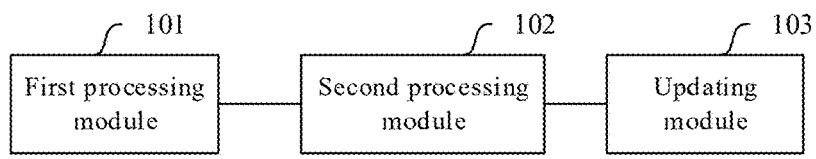
FIG. 5 is a schematic structural diagram of an apparatus for optimizing OTN resources according to the present disclosure.

Based on a same technical concept, the present disclosure further provides an apparatus for optimizing OTN resources. As shown in FIG. 5, the apparatus for optimizing OTN resources includes a first processing module 101, a second processing module 102 and an updating module 103.

The first processing module 101 is configured to determine and create, according to an action policy, a service to be created in a current service creation state, calculate a timely reward in the current service creation state, enter a next service creation state until an episode is ended, and calculate and update, according to the timely reward in each service creation state, an optimized objective policy parameter in each service creation state; and iterate a preset number of episodes to calculate and update the optimized objective policy parameter in each service creation state.

The second processing module 102 is configured to determine, according to the optimized objective policy parameter in each service creation state in the preset number of episodes, an resultant/desired optimized objective policy parameter in each service creation state.

The updating module 103 is configured to update the action policy according to the resultant/desired optimized objective policy parameter in each service creation state.

In some implementations, the first processing module 101 is configured to calculate, according to the timely reward in each service creation state after the next service creation state, an expected return in the current service creation state; and calculate and update, according to the expected return in the current service creation state, the optimized objective policy parameter in the current service creation state.

In some implementations, the first processing module 101 is configured to calculate the expected return in the current service creation state by $$G_t = \sum_{k=0}^{n-(t+1)} \gamma^k R_{t+k+1};$$

where $G_t$ is the expected return of executing an action $a_t$ in a service creation state $S_t$, γ is a discount coefficient, and 0<γ<1; R is the timely reward, t is the number of created services in the service creation state $S_t$, t=(0, ..., n−1), and n is a total number of services to be created in an OTN.

In some implementations, the expected return in the last service creation state of each episode is an actual total return for the episode, and the first processing module 101 is further configured to, after calculating the actual total return in the last service creation state of each episode and before calculating the optimized objective policy parameter in the last service creation state of each episode, update the actual total return according to the actual total return, a preset threshold and a preset additional return, and if the actual total return is greater than or equal to the threshold, the actual total return is equal to the actual total return plus the additional return, if the actual total return is less than the threshold, the actual total return is equal to the actual total return minus the additional return.

In some implementations, the optimized objective policy parameter includes a state behavior value $Q_\pi(s,a)$, and $$Q_\pi(s, a) = E_\pi\left[\sum_{k=0}^{n-(t+1)} \gamma^k R_{t+k+1} \middle| s = s_t, a = a_t\right];$$

or the optimized objective policy parameter includes a state value $V_\pi(s)$, and $$V_\pi(s) = \sum_{a \in A} \pi(a|s)Q_\pi(s, a),$$

π(a|s) is a probability of taking an action a according to an action policy π(s,a) in the service creation state S, and a is a set of actions performed in each service creation state.

In some implementations, in response to that the optimization objective policy parameter is the state behavior value $Q_\pi(s,a)$, the optimized objective policy parameter in each service creation state is calculated and updated with a Monte Carlo process (MCP), a TD-Error algorithm with different policies or a TD-Error algorithm with a same policy.

The updating module 103 is configured to update the action policy according to the state behavior value $Q_\pi(s,a)$.

In some implementations, in response to that the optimized objective policy parameter is the state value $V_\pi(s)$, the optimized objective policy parameter is calculated with a dynamic programming algorithm.

The updating module 103 is configured to update the action policy according to the state value $V_\pi(s)$.

In some implementations, the first processing module 101 is configured to: calculate a probability of selecting each service to be created in the current service creation state; determine a service to be created according to the probability of selecting each service to be created in the current service creation state; rank, according to a preset OTN optimization objective function, alternate routings for the determined service to be created; calculate, according to the number of the ranked alternate routings, a probability of selecting each alternate routing in the ranked alternate routings; and determine, according to the probability of selecting each alternate routing in the ranked alternate routings, one alternate routing as the routing for the service to be created in the current service creation state.

In some implementations, the first processing module 101 is configured to calculate the probability of selecting each service to be created in the current service creation state by $$p(s_{tsvci}) = \frac{1}{n-t};$$

where $p(s_{t_{vci}})$ is a probability of selecting an $i^{th}$ service $Svc_i$ in a service creation state $S_t$, t is the number of created services in the service creation state $S_t$, t=(0, ..., n−1), and n is a total number of services to be created in the OTN.

In some implementations, the OTN optimization objective function includes a minimum routing cost of the OTN service or a shortest latency of the OTN service.

In some implementations, the first processing module 101 is configured to calculate, if the number m of the ranked alternate routings is equal to 1, the probability of selecting the alternate routing by:

$$\mu(s_t, a_{t1}) = \frac{1}{n-t};$$

calculate, if the number m of the ranked alternate routings is equal to 2, the probability of selecting one alternate routing by:

$$\mu(s_t, a_{t1}) = \frac{\varepsilon}{n-t},$$

the probability of selecting the other alternate routing by:

$$\mu(s_t, a_{t2}) = \frac{1-\varepsilon}{n-t};$$

and calculate, if the number m of the ranked alternate routings is greater than 2 (i.e., m>2), the probability of selecting each of the first to (m−1)$^{th}$ alternate routings by:

$$\mu(s_t, a_{ti}) = \frac{(1-\varepsilon)^{i-1}}{n-t} \cdot \varepsilon,$$

and the probability of selecting the m$^{th}$ alternate routing by:

$$\mu(s_t, a_{tm}) = \frac{(1-\varepsilon)^{m-1}}{n-t};$$

where $\varepsilon$ is a greedy coefficient, and $0.5<\varepsilon<1$, t is the number of created services in the service creation state $S_t$, t=(0, ..., n−1), and n is a total number of services to be created in the OTN, and i=(1, ..., m−1).

The present disclosure further provides a computer device, including: at least one processor and a storage device. The storage device has at least one program stored thereon, the at least one program, when executed by the at least one processor, causes the at least one processor to perform the method for optimizing OTN resources described above.

The present disclosure further provides a computer-readable storage medium storing a computer program thereon, the computer program, when executed by a processor, causes the processor to perform the method for optimizing OTN resources described above.

Those of ordinary skill in the art will appreciate that all or some operations of the above described method, functional modules/units in the apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components.

Some or all physical components may be implemented as software executed by a processor, such as a CPU, a digital signal processor or microprocessor, or implemented as hardware, or implemented as an integrated circuit, such as an application specific integrated circuit. Such software may be distributed on a computer-readable medium which may include a computer storage medium (or non-transitory medium) and communication medium (or transitory medium). The term computer storage medium includes volatile and nonvolatile, removable and non-removable media implemented in any method or technology for storage of information such as computer-readable instructions, data structures, program modules or other data, as is well known to those of ordinary skill in the art. The computer storage medium includes, but is not limited to, an RAM, an ROM, an EEPROM, a flash or any other memory technology, a CD-ROM, a digital versatile disc (DVD) or any other optical disc storage, a magnetic cartridge, a magnetic tape, a magnetic disk storage or any other magnetic storage device, or may be any other medium used for storing the desired information and accessible by a computer. Moreover, it is well known to those ordinary skilled in the art that a communication medium typically includes a computer-readable instruction, a data structure, a program module, or other data in a modulated data signal, such as a carrier wave or other transport mechanism, and may include any information delivery medium.

The present disclosure has disclosed exemplary implementations, and although specific terms are employed, they are used and should be interpreted merely in a generic and descriptive sense, not for purposes of limitation. In some instances, features, characteristics and/or elements described in connection with a particular implementation may be used alone, or may be used in combination with features, characteristics and/or elements described in connection with other implementations, unless expressly stated otherwise, as would be apparent to one skilled in the art. It will, therefore, be understood by those skilled in the art that various changes in form and details may be made without departing from the scope of the present disclosure as set forth in the appended claims.

What is claimed is:

1. A method for optimizing network resources of an optical transport network (OTN), comprising:
   determining and creating, according to an action policy, a service to be created in a current service creation state, calculating a timely reward in the current service creation state, entering a next service creation state until an episode is ended, and calculating and updating, according to the timely reward in each service creation state, an optimized objective policy parameter in each service creation state;
   iterating a preset number of episodes to calculate and update the optimized objective policy parameter in each service creation state;
   determining, according to the optimized objective policy parameter in each service creation state in the preset number of episodes, a resultant optimized objective policy parameter in each service creation state; and
   updating the action policy according to the resultant optimized objective policy parameter in each service creation state,
   wherein the calculating and updating, according to the timely reward in each service creation state, an optimized objective policy parameter in each service creation state comprises:
   calculating, according to the timely reward in each service creation state after the next service creation state, an expected return in the current service creation state; and
   calculating and updating, according to the expected return in the current service creation state, the optimized objective policy parameter in the current service creation state,
   wherein the expected return in a last service creation state of each episode is an actual total return for the episode, and the method further comprises:
   after calculating the actual total return in the last service creation state of each episode and before calculating the optimized objective policy parameter in the last service creation state of each episode, updating the actual total return according to the actual total return, a preset threshold and a preset additional return; wherein, if the actual total return is greater than or equal to the threshold, the actual total return is equal to a sum of the actual total return and the additional return; if the actual total return is less than the threshold, the actual total return is equal to a difference between the actual total return and the additional return.

2. The method according to claim 1, wherein the expected return in the current service creation state is calculated by:

$$G_t = \sum_{k=0}^{n-(t+1)} \gamma^k R_{t+k+1};$$

$G_t$ is the expected return of executing an action $a_t$ in a service creation state $S_t$, $\gamma$ is a discount coefficient, and $0 < \gamma < 1$; R is the timely reward, t is the number of created services in the service creation state $S_t$, t=(0, ..., n−1), and n is a total number of services to be created in the OTN.

3. The method according to claim 1, wherein the optimized objective policy parameter comprises a state behavior value, and $Q_\pi(s,a)$ $$Q_\pi(s, a) = E_\pi\left[\sum_{k=0}^{n-(t+1)} \gamma^k R_{t+k+1} | s = s_t, a = a_t\right];$$

or, the optimized objective policy parameter comprises a state value $V_\pi(s)$ and $$V_\pi(s) = \sum_{a \in A} \pi(a|s) Q_\pi(s, a),$$

wherein π(a|s) is a probability of taking an action a according to an action policy π(s,a) in the service creation state S, and a is a set of actions performed in each service creation state.

4. The method according to claim 3, wherein the optimized objective policy parameter is the state behavior value $Q_\pi(s,a)$, and the optimized objective policy parameter in each service creation state is calculated and updated with a Monte Carlo process (MCP), a TD-Error algorithm with different policies or a TD-Error algorithm with a same policy,
   the updating the action policy according to the resultant optimized objective policy parameter in each service creation state comprises: updating the action policy according to the state behavior value $Q_\pi(s,a)$.

5. The method according to claim 3, wherein the optimized objective policy parameter is the state value $V_\pi(s)$, and the optimized objective policy parameter is calculated with a dynamic programming algorithm; and
   the updating the action policy according to the resultant optimized objective policy parameter in each service creation state comprises: updating the action policy according to the state value $V_\pi(s)$.

6. The method according to claim 1, wherein the determining, according to an action policy, a service to be created in a current service creation state comprises:
   calculating a probability of selecting each service to be created in the current service creation state;
   determining a service to be created according to the probability of selecting each service to be created in the current service creation state;
   ranking, according to a preset OTN optimization objective function, alternate routings for the determined service to be created;
   calculating, according to a number of ranked alternate routings, a probability of selecting each alternate routing in the ranked alternate routings; and
   determining, according to the probability of selecting each alternate routing in the ranked alternate routings, one alternate routing as the routing for the service to be created in the current service creation state.

7. The method according to claim 6, wherein the probability of selecting each service to be created in the current service creation state is calculated by:

$$p(s_{tvsci}) = \frac{1}{n-t};$$

where $p(s_{tsvci})$ is a probability of selecting an $i^{th}$ service $Svc_i$ in a service creation state $S_t$, t is the number of created services in the service creation state $S_t$, t=(0, . . . , n−1), and n is a total number of services to be created in the OTN.

8. The method according to claim 6, wherein the OTN optimization objective function comprises a minimum routing cost of an OTN service or a shortest latency of an OTN service.

9. The method according to claim 6, wherein the calculating, according to a number of ranked alternate routings, a probability of selecting each alternate routing in the ranked alternate routings comprises:

calculating, if the number m of the ranked alternate routings is equal to 1, the probability of selecting the alternate routing by:

$$\mu(s_t, a_{t1}) = \frac{1}{n-t};$$

calculating, if the number m of the ranked alternate routings is equal to 2, the and the probability of probability of selecting one alternate routing by:

$$\mu(s_t, a_{t1}) = \frac{\varepsilon}{n-t},$$

selecting the other alternate routing by;

$$\mu(s_t, a_{t2}) = \frac{1-\varepsilon}{n-t};$$

and calculating, if the number m of the ranked alternate routings is greater than 2, the probability of selecting each of first to $(m-1)^{th}$ alternate routings by:

$$\mu(s_t, a_{ti}) = \frac{(1-\varepsilon)^{i-1}}{n-t} \cdot \varepsilon,$$

and the probability of selecting an $m^{th}$ alternate routing by:

$$\mu(s_t, a_{tm}) = \frac{(1-\varepsilon)^{m-1}}{n-t};$$

where $\varepsilon$ is a greedy coefficient, and 0.5<$\varepsilon$<1, t is the number of created services in the service creation state $S_t$, t=(0, . . . , n−1), n is a total number of services to be created in the OTN, and i=(1, . . . , m−1).

10. A computer device, comprising:

at least one processor;

a storage device having at least one program stored thereon, the at least one program, when executed by the at least one processor, causes the at least one processor to implement the method for optimizing OTN resources according to claim 1.

11. A computer-readable storage medium having a computer program stored thereon, the computer program, when executed by a processor, causes the processor to implement the method for optimizing OTN resources according to claim 1.

12. A method for optimizing network resources of an optical transport network (OTN), comprising:

determining and creating, according to an action policy, a service to be created in a current service creation state, calculating a timely reward in the current service creation state, entering a next service creation state until an episode is ended, and calculating and updating, according to the timely reward in each service creation state, an optimized objective policy parameter in each service creation state;

iterating a preset number of episodes to calculate and update the optimized objective policy parameter in each service creation state;

determining, according to the optimized objective policy parameter in each service creation state in the preset number of episodes, a resultant optimized objective policy parameter in each service creation state; and updating the action policy according to the resultant optimized objective policy parameter in each service creation state, wherein the calculating and updating, according to the timely reward in each service creation state, an optimized objective policy parameter in each service creation state comprises:

calculating, according to the timely reward in each service creation state after the next service creation state, an expected return in the current service creation state; and calculating and updating, according to the expected return in the current service creation state, the optimized objective policy parameter in the current service creation state, wherein the optimized objective policy parameter comprises a state behavior value $Q_\pi(s,a)$, and $$Q_\pi(s, a) = E_\pi \left[ \sum_{k=0}^{n-(t+1)} \gamma^k R_{t+k+1} | s = s_t, a = a_t \right];$$

or, the optimized objective policy parameter comprises a state value $V_\pi(s)$ and $$V_\pi(s) = \sum_{a \in A} \pi(a | s) Q_\pi(s, a),$$

wherein $\pi$(a|s) is a probability of taking an action a according to an action policy $\pi$(s,a) in the service creation state S, and a is a set of actions performed in each service creation state.

13. A method for optimizing network resources of an optical transport network (OTN), comprising:
- determining and creating, according to an action policy, a service to be created in a current service creation state, calculating a timely reward in the current service creation state, entering a next service creation state until an episode is ended, and calculating and updating, according to the timely reward in each service creation state, an optimized objective policy parameter in each service creation state;
- iterating a preset number of episodes to calculate and update the optimized objective policy parameter in each service creation state;
- determining, according to the optimized objective policy parameter in each service creation state in the preset number of episodes, a resultant optimized objective policy parameter in each service creation state; and
- updating the action policy according to the resultant optimized objective policy parameter in each service creation state, wherein the determining, according to an action policy, a service to be created in a current service creation state comprises:
- calculating a probability of selecting each service to be created in the current service creation state;
- determining a service to be created according to the probability of selecting each service to be created in the current service creation state;
- ranking, according to a preset OTN optimization objective function, alternate routings for the determined service to be created;
- calculating, according to a number of ranked alternate routings, a probability of selecting each alternate routing in the ranked alternate routings; and
- determining, according to the probability of selecting each alternate routing in the ranked alternate routings, one alternate routing as the routing for the service to be created in the current service creation state.

* * * * *